United States Patent [19]

Stuart et al.

[11] Patent Number: 4,624,472
[45] Date of Patent: Nov. 25, 1986

[54] COUPLING MECHANISM FOR COUPLING FLUID AND ELECTRICAL LINES BETWEEN ADJACENT VEHICLES

[76] Inventors: Clifton F. Stuart, Rte. 1, Box 137, Lynnville, Tenn. 38472; Harold E. Eskridge, 3196 Wadsworth Rd., Norton, Ohio 44203

[21] Appl. No.: 742,212

[22] Filed: Jun. 6, 1985

Related U.S. Application Data

[63] Continuation-in-part of Ser. No. 571,784, Jan. 18, 1984, abandoned.

[51] Int. Cl.⁴ .................... B60D 1/08; H01R 13/44; H01B 7/14
[52] U.S. Cl. .................................. 280/420; 138/115; 174/47; 285/131; 339/10
[58] Field of Search ....................... 280/420, 421, 422; 138/115, 178, 111; 174/47; 339/10, 75 P; 285/131, 119

[56] References Cited

U.S. PATENT DOCUMENTS

| | | | |
|---|---|---|---|
| 3,888,513 | 6/1975 | Pilz et al. | 280/421 |
| 3,915,476 | 10/1975 | Burkle | 280/422 |
| 4,092,034 | 5/1978 | Becker | 280/420 |
| 4,196,307 | 4/1980 | Moore et al. | 174/47 |
| 4,366,965 | 1/1983 | Rhodes | 280/421 |
| 4,475,751 | 10/1984 | Nishimura | 280/421 |

Primary Examiner—John J. Love
Assistant Examiner—Donn McGiehan
Attorney, Agent, or Firm—Carothers & Carothers

[57] ABSTRACT

A coupling mechanism for coupling a plurality of fluid and electrical lines between adjacent coupled vehicles wherein a plurality of elongated flexible fluid lines and electrical lines are grouped together to form a single elongated flexible group line with one end of the group line connected to respective fluid and electrical sources on one vehicle and the other end of the group line connected to respective fluid and electrical loads on the other vehicle through a single hybrid or combination fluid and electrical plug and socket arrangement. The plug and socket arrangement is comprised of a mounting bracket for the plug and a mounting bracket for the socket, one of which is secured to the second vehicle. The mounting brackets are adapted such that one bracket is readily hung on the other bracket and thereby automatically prealigns the plug and socket for engagement. After this self-prealigning engagement is accomplished a lever mechanism or the like is provided which engages the plug and socket together when actuated in a locked coupling position.

23 Claims, 26 Drawing Figures

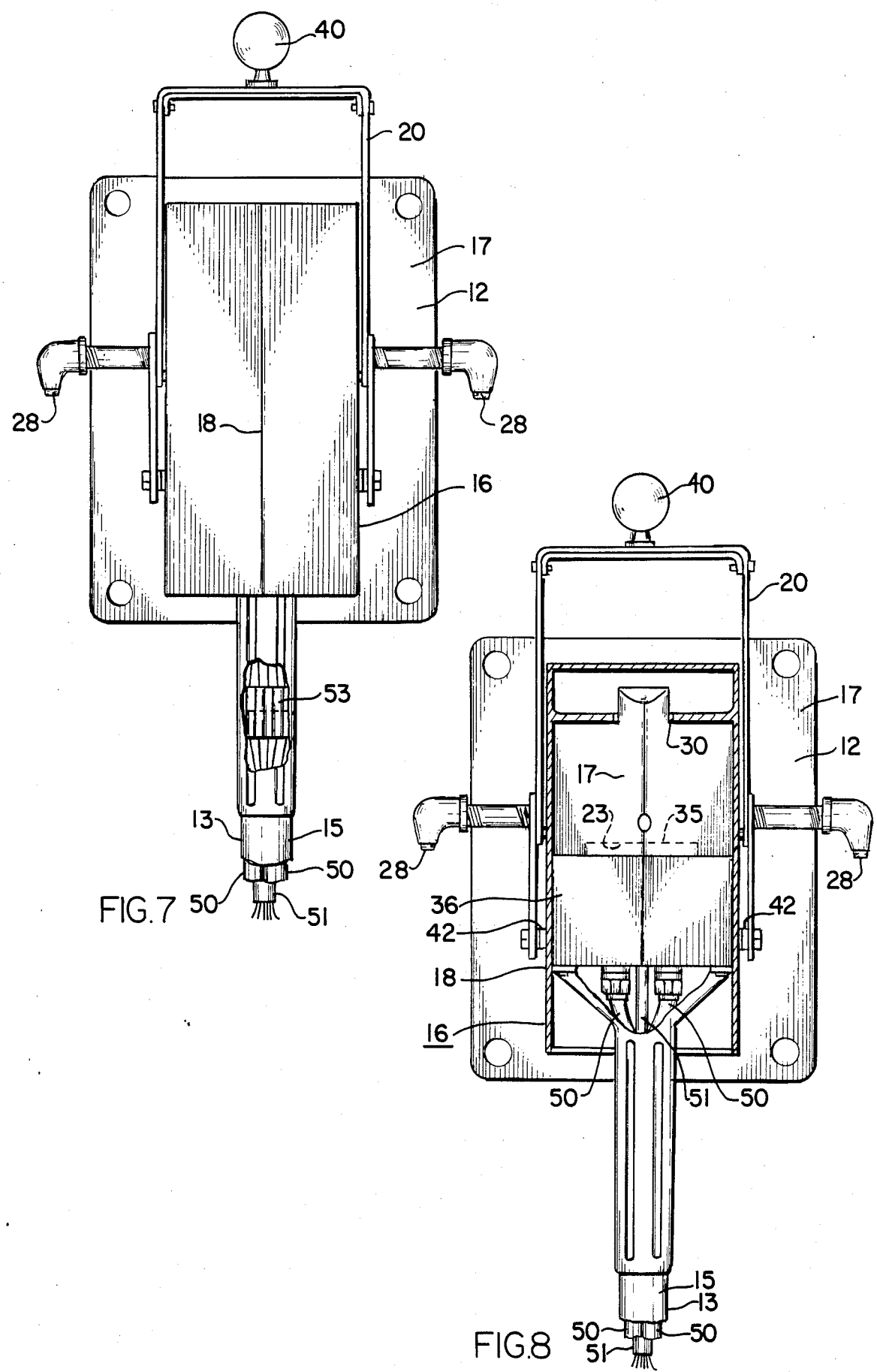

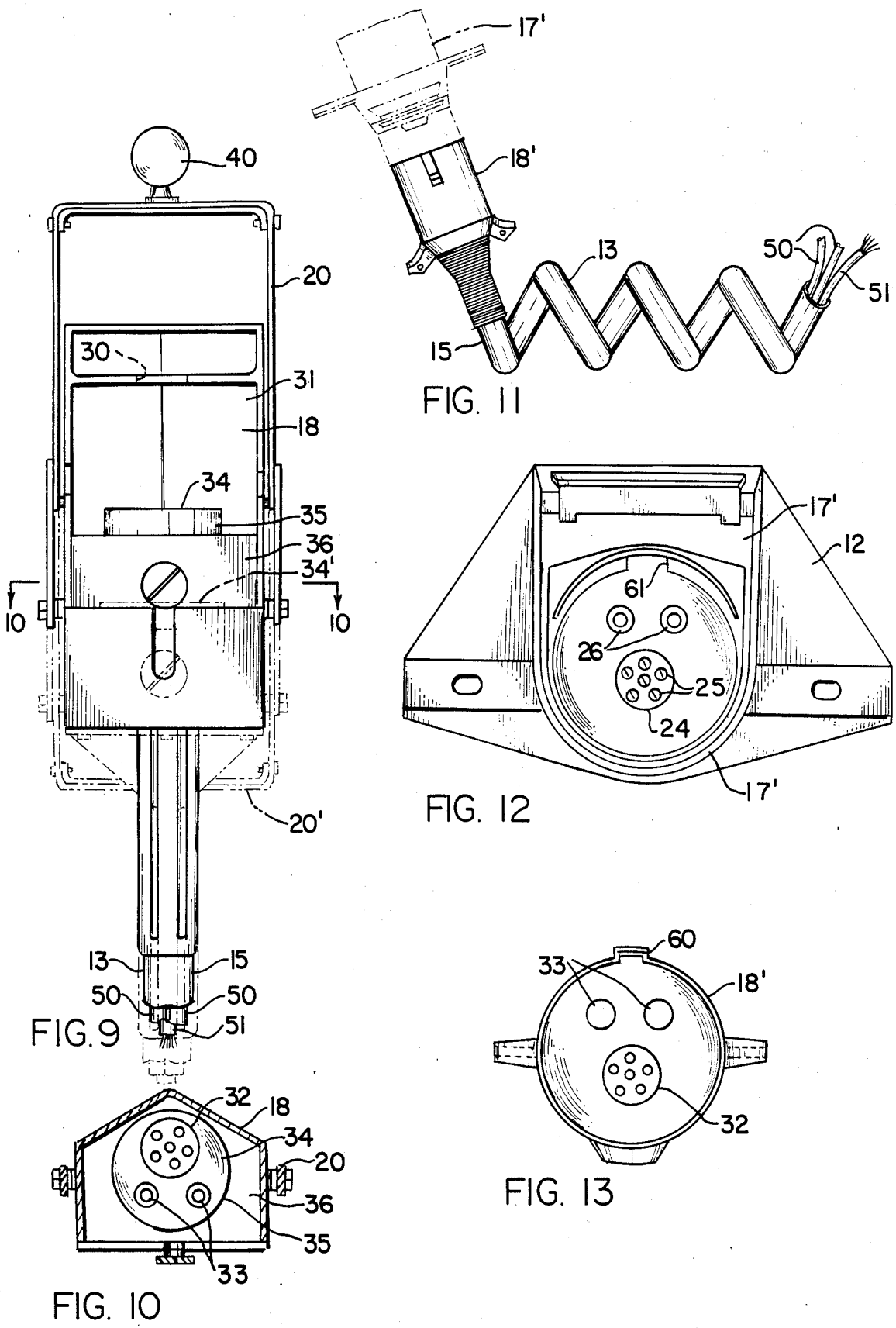

COUPLING MECHANISM FOR COUPLING FLUID AND ELECTRICAL LINES BETWEEN ADJACENT VEHICLES

BACKGROUND OF THE INVENTION

This application is a continuation-in-part of prior copending application Ser. No. 571,784, field Jan. 18, 1984, now abandoned 9/23/86.

The present invention relates generally to couplings, and more particularly to couplings for fluid and electrical lines between adjacent coupled vehicles, such as between tractor and trailer or as between railroad cars.

The present invention will be discussed primarily with regard to the connection of fluid and electrical lines between a motor vehicle tractor and its tandem trailer or trailers, however the invention is applicable to other adjacent objects or vehicles wherein electrical and fluid connections must be completed therebetween.

In present day motor vehicle tractor-trailer combinations air lines and electrical lines must be connected between the tractor and the trailer for operation of the trailer brakes and lights. Generally, particularly in the U.S.A., there are two air lines and one multiple conductor electrical line which must be independently coupled from the tractor to the trailer. These air lines and the electrical lines are sometimes provided in a permanently coiled form with an elastic memory in order to keep slack out of the lines.

In hooking up the tractor to the trailer, the tractor is normally backed up to the trailer and the trailer front is lowered and mechanically hitched to the tractor. Thereafter, the free ends or coupling ends of the air lines and the electrical lines are retrieved from a hanging position on the back of the tractor cab and respectively connected to the trailer with conventional couplings. The air lines are generally connected with couplings known in the trade as glad hand couplings and the multiple conductor electrical line is connected by way of a conventional plug-in socket arrangement. Coupling of the air lines and the electrical lines must be carried out independent of each other and the process is time consuming.

In addition, since the operator is dealing with three lines, the three lines tend to become entangled with each other and the operator also sometimes encounters problems in trying to unhook or otherwise remove the three ends of the lines from the tractor cab exterior for connection to the trailer, thereby further aggravating the hook-up procedure.

In addition, when not in use, the glad-hand couplings and the electrical plug are exposed to the elements and become corroded thereby making coupling more difficult and in some situations even unsafe. Also, due to the fact that these glad hand couplings and the electrical plug and socket connection are always prealigned by hand for engagement, this not only causes improper wear on the coupling parts or plug and socket parts after repeated use, but generally makes it more difficult in any regard for the operator to engage the respective couplings or plug and socket.

In fact, in time the pins and sockets of the electrical plug and socket arrangement can become so deformed and misaligned from mishandling and/or corroded from the elements, and/or burred due to electrical arcing on the connection, it becomes extremely difficult, if not impossible, to engage and disengage the electrical plug and socket arrangement. Thus, poor electrical connections can be made whereby the trailer lights do not properly operate.

The conventional electrical plug and socket arrangement is set up such that when the plug is fully engaged into the electrical socket, a hinged cover plate for the socket is provided with a catch to receive a protruding tine from the plug under spring bias in order to prevent the plug from accidentally dislodging from the socket. However, after this electrical coupling has become damaged as previously described, it is possible that the operator cannot fully engage the plug into the socket such that the safety retaining mechanism is not engaged and the plug can easily dislodge itself due to vibration. The opposite effect has also been encountered wherein it becomes extremely difficult to unplug the connection due to mechanical distortions in the socket, corrosion, etc.

Once the couplings and plug and socket have also been disconnected from the trailer, there is generally no convenient means provided for retaining the free ends of the lines to the back of the tractor.

It is a principal object of the present invention to provide a coupling mechanism which eliminates or at least greatly reduces the aforementioned disadvantages and generally provides a much safer coupling of the air and electrical lines.

The coupling mechanism of the present invention, in its simplest embodiment, comprises a plurality of elongated energy conveying lines, such as fluid and electrical lines, which are flexible and grouped together to form a single elongated flexible group line for coupling between adjacent coupled vehicles. One end of the group line is connected to respective energy sources on one vehicle and the other end of the group line is connected to energy loads on another vehicle to a single hybrid or combination plug and socket arrangement. The group line is preferably a single elongated run of extruded or continuously molded reinforced elastomeric material having defined therein a plurality of integrally formed longitudinally extending channels wherein selected ones of the channels serve to convey pressurized air and at least one other channel receives and carries the required runs of electrical cable.

In an even more novel embodiment of the present invention, this plug and socket arrangement includes a first mounting bracket secured to one of the vehicles (usually the trailing vehicle) and a second mounting bracket secured to the free end of the group line which extends from the other vehicle (which would generally be the lead vehicle or leading vehicle). This second mounting bracket is adapted for mating and prealigned hanging engagement on the first mounting bracket, such that when this second mounting bracket is hung on the first bracket, the plug and socket, which are secured to respective of the mounting brackets, are thereby prealigned for eventual plug and socket engagement. A rotary drive means or mechanism such as a rotary camming device or a pivoted lever and over center-toggle device is also provided on this plug and socket arrangement and is operable to drive the plug and socket into coupling engagement with each other after they have been prealigned by hanging the one bracket onto the other.

One embodiment for providing this prealignment of the two mounting brackets, and thereby also providing prealignment of the plug and socket, is accomplished by providing a vertically extending horn secured to the upper portion of one of the brackets, and an opening in the upper portion of the other of the brackets for receiving and seating the horn such that one bracket is hanging on the other in proper alignment. To further insure proper alignment, the body portions of both of the brackets which underlie the horn and the opening may further be provided respectively with mating convex and concave contoured seating services adapted to gravitationally self-align the one bracket with the other to thereby accurately prealign the plug and socket.

A false or "dummy" bracket may also be secured to the back of the lead vehicle so that when the lead vehicle is not towing, the free end of the group line with its bracket member attached thereto may be stored on this dummy block to keep it secure and to keep the electrical or fluid line contacts clean.

The flexible group line may be permanently spring coiled with elastic memory in order to keep slack out of the line when in use.

In addition, switch means may be provided on the plug and socket arrangement and positioned to be actuated by the aforedescribed drive means or lever means, when the same is moved to a fully actuated position to electrically engage electrical lines when the plug and socket are engaged after prealignment. This mechanism reduces the possibility of arcing occurring upon making of electrical contact which might otherwise burr or otherwise damage the electrical contacts of the plug and socket.

Whichever one of the plug or socket which is secured to the mounting bracket on the vehicle being towed, will be preferably positioned on the bottom of that bracket so that when the towed vehicle is not under tow, the electrical and/or fluid contacts are facing downwardly and are thereby protected from the elements by the shielding of the bracket itself.

Other objects and advantages appear in the following description and claims.

The accompanying drawings show, for the purpose of exemplification, without limiting the invention or claims thereto, certain practical embodiments illustrating the principles of this invention wherein:

FIG. 7 is a view in front elevation of the coupling mechanism illustrated in FIG. 5 with lower portions thereof removed to expose electrical fusing.

FIG. 8 is a view in front elevation of the coupling mechanism illustrated in FIG. 5 with the front cover plate of the second and outer mounting bracket sections away to expose the interior of the coupling mechanism as seen along angular section line 8—8. Portions of the handle at the bottom of the coupling mechanism are also sectioned away to expose interior electric and fluid connections.

FIG. 9 is a view in back elevation of the second mounting bracket shown in FIG. 5 alone with added chain outline to illustrate operation of the locking mechanism for securing the mounting brackets together.

FIG. 10 is a plan view of the first mounting bracket illustrated in FIG. 9 as seen in section along section line 10—10.

FIG. 11 is a plan view of a less preferred and simplified version of the coupling mechanism of the present invention illustrating the grouped lines to be coupled in combination with a hybrid electrical and fluid plug shown in full lines and a female socket therefore shown in chain outline.

FIG. 12 is a front end view of the female socket illustrated in chained outlet in FIG. 11.

FIG. 13 is an end view of the male plug shown in full lines in FIG. 11.

Figure 1:
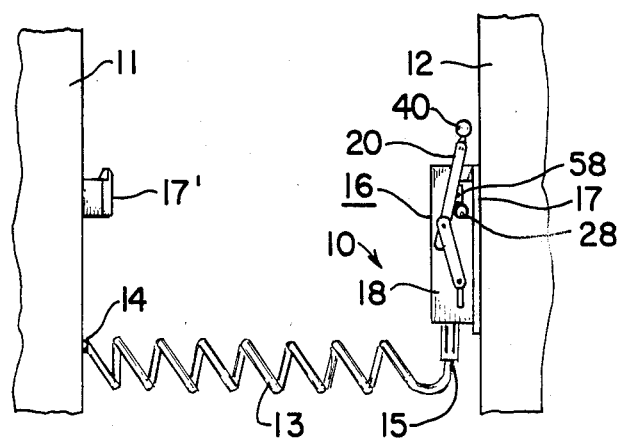
FIG. 1 is a view in side elevation of a preferred embodiment of the coupling mechanism of the present invention illustrating the coupling of group, electrical and fluid lines between a tractor cab and a trailer in tow.

Referring to FIG. 1 of the drawings, one prefered embodiment of the coupling mechanism 10 of the present invention is illustrated for coupling a plurality of elongated flexible energy conveying lines, such as fluid and electrical lines, between a tractor cab 11 and its trailer 12 being towed thereby. For the sake of simplicity, the mechanical tow coupling between tractor cab 11 and trailer 12 is not illustrated.

All of the electrical lines running from cab 11 to trailer 12 for operating the trailer lights, or other electrical equipment on the trailer, and all of the air lines running from the cab 11 to the trailer 12 for operating the brake systems in the trailer 12 are grouped together to form a single elongated flexible group line 13. Group line 13 is here illustrated as a flexible group line which is permanently spring coiled with elastic memory to assist in preventing any entanglement and to take up any slack in the flexible line connection between the cab and trailer. As an alternative, the flexible group line 13 need not necessarily be so coiled.

One end 14 of group line 13 is connected to respective energy sources, or electric and air pressure sources, in the tractor cab 11. These energy sources are conventional in nature and are not illustrated. The other end 15 of group line 13 is connected to respective energy loads, or respective electrical (running lights etc.) and fluid loads (such as brake loads), on the trailer 12. Again these electrical light or lamp loads and fluid brake loads are very conventional in nature and are not illustrated. This other end 15 of the group line is connected to these respective energy loads on trailer 12 through a single hybrid or combination plug and socket arrangement generally indicated at 16. Plug and socket arrangement 16 basically consists of a first mounting bracket 17 secured to the towed trailer 12 and a second mounting bracket 18 secured to the other end 15 of group line 13. This second mounting bracket 18 is adapted for mating and prealigned hanging engagement on first mounting bracket 17. The two mating mounting brackets are provided with a plug and socket arrangement such that when the second mounting bracket 18 is hung on first mounting bracket 17, the plug and socket, which are secured to respective of the mounting brackets, are thereby automatically prealigned for plug and socket engagement. The detail regarding the plug and socket arrangement will be discussed hereinafter.

Drive means 20 is also provided on this plug and socket arrangement in the form of a lever actuated mechanism which is operable to drive the plug and socket into coupling engagement with each other after they have been prealigned as previously described.

Figure 4:
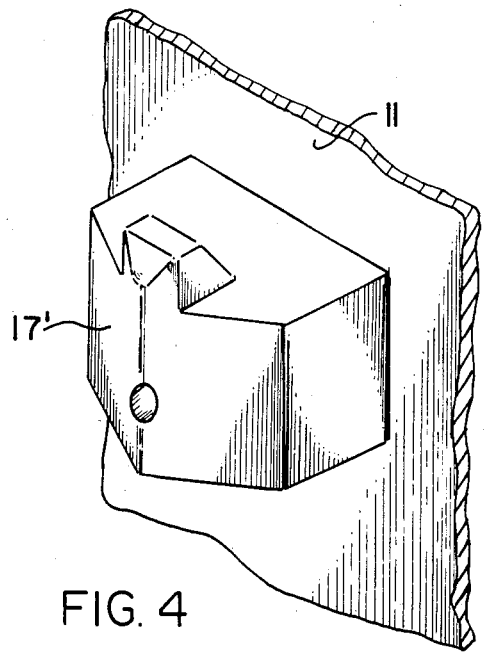
FIG. 4 is an enlarged oblique view of the false or "dummy" mounting bracket secured to the back of the tractor cab in FIG. 1.
Figure 5:
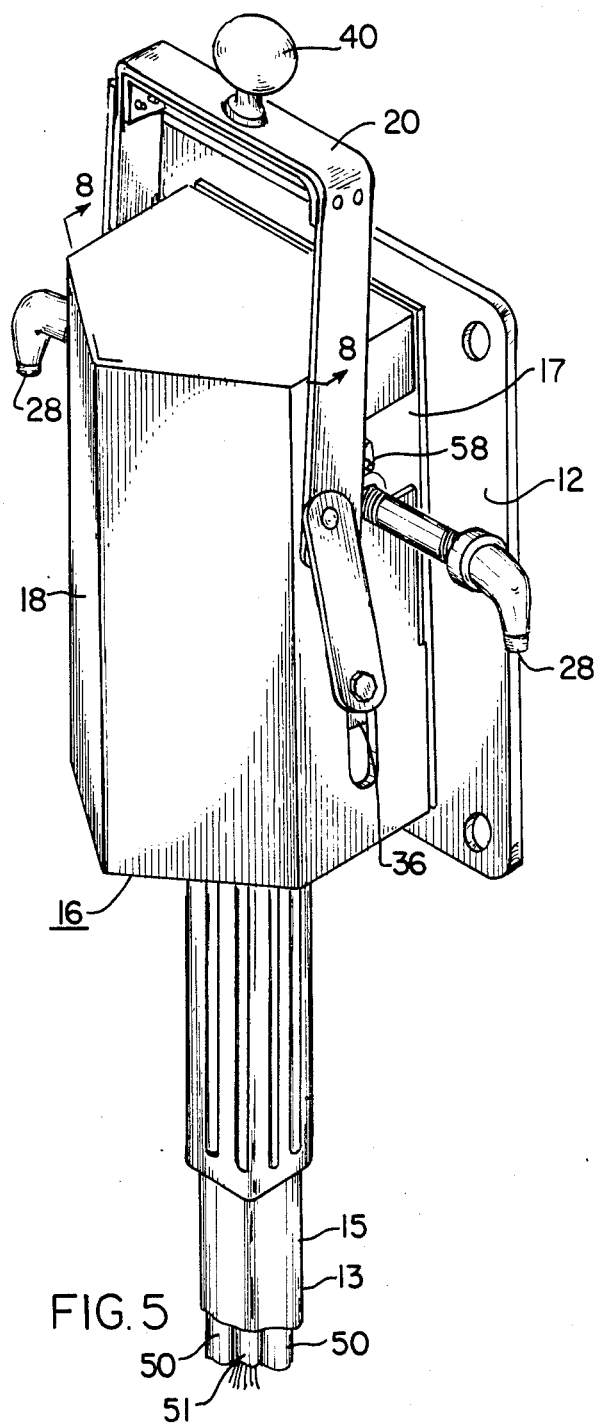
FIG. 5 is an enlarged oblique view of the coupling mechanism shown in FIG. 1 secured to the front end of the trailer with the first mounting bracket of FIG. 2 having a second mounting bracket mounted thereon and locked into plug and socket engagement.

When the trailer 12 is to be uncoupled from tractor 11, the drive means or locking mechanism in the form of lever mechanism 20 is disengaged and bracket member 18 is picked up off of bracket member 17. Bracket member 18 may then be stored on the back of tractor cab 11 by mounting it to false or dummy mounting bracket 17' in the same manner that second mounting bracket 16 is coupled to and uncoupled from first mounting bracket 17. The detail of false mounting bracket 17' will be discussed hereinafter with reference to FIG. 4.

Figure 3:
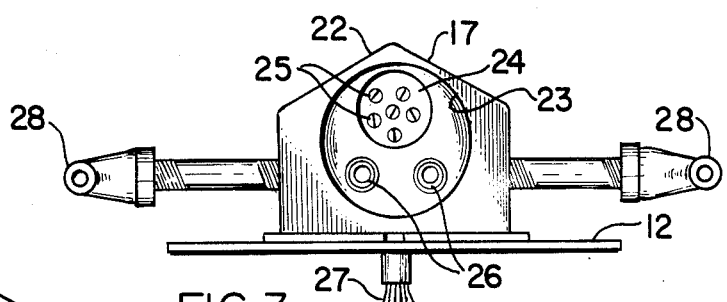
FIG. 3 is a bottom view of the first mounting bracket shown in FIG. 2.
Figure 2:
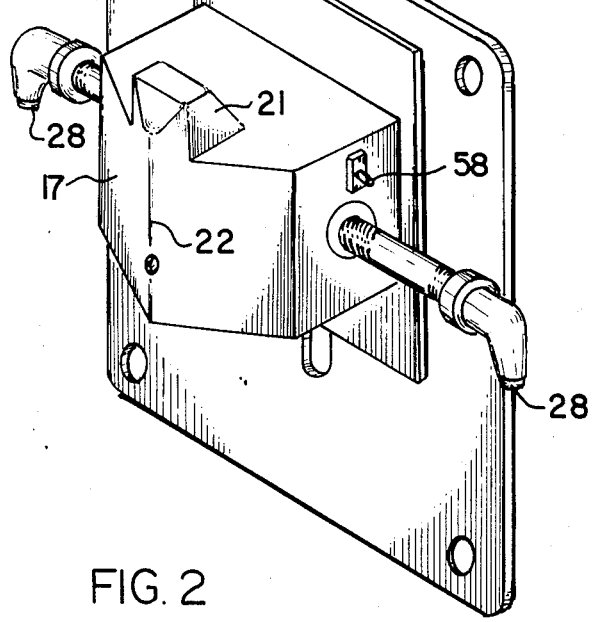
FIG. 2 is an enlarged top oblique view of a first mounting bracket portion of the coupling mechanism shown in FIG. 1 which is secured to the forward end of the trailer in the view illustrated in FIG. 1.

Reference is now made with regard to FIGS. 2, 3 and 5 through 10 which show the detail of plug and socket arrangement 16. The detail of the first mounting bracket 17 alone, without the attachment thereto of second mounting bracket 18, is shown in FIGS. 2 and 3. This first mounting bracket 17 is provided with a vertically extending horn 21 secured to the upper portions thereof. The body of first bracket member 17, which underlies the horn 21, is provided with a convexly contoured seating surface 22.

The bottom of first mounting bracket 17 (see FIG. 3) is provided with a socket recess 23 which retains electrical male plug 24 having six downwardly extending electrical contacts 25, and two male air line connectors 26 for supply of air under pressure to the trailer brakes. Male electrical connectors 25 supply electrical power to the trailer lights by way of electrical conductors 27, which are connected to electrical contacts 25, and male air line connectors 26 supply air to the trailer brakes via their respective conduits or pipes 28. Male electrical contacts 25 and male fluid connectors 26 are projected from the elements within recess 23 underneath mounting bracket 17 when the bracket 17 is not in use, or when the second mounting bracket 18 is not attached thereto.

Second mounting bracket 18 provided with a mating female socket for electrical contacts 25 and air line contacts with connectors 26. This is best illustrated in FIGS. 9 and 10 and will be explained in greater detail hereinafter.

With additional reference to FIGS. 5, 6, 7, 8, 9, and 10, the second mounting bracket 18, which hangs on to mounting bracket 17, is internally at its upper portions provided with an opening 30 for receiving and seating the horn 21 of first bracket member 17, such that second mounting bracket 18 hangs on first mounting bracket 17. Also, the underlying internal portions of second bracket member 18 are provided with concave contoured seating surfaces 31 which mate the convex body portions 22 of first mounting bracket 17 such that these mating convex and concave contoured seating surfaces permit second bracket member 18 gravitationally self-align itself vertically on to first mounting bracket 17 after horn 21 has initially been engaged in opening 30 of second mounting bracket 18. Thus, when second mounting bracket 18 is simply hunt on to first mounting bracket 17, electrical plug 24 and air line connections or plugs 26 of first mounting block 17 (see FIG. 3) will automatically be aligned or prealigned, for engagement with the female electrical sockets 32 and female air line connectors or sockets 33 on second mounting bracket 18 (see FIG. 10).

Electrical female socket 32 and female air line sockets 33 are mounted, or recessed into, the upper surface 34 of annular protrusion 35, which protrudes upwardly from slide block 36. Slide block 36 (best illustrated in FIGS. 8, 9 and 10) is adapted to slide up and down within second bracket member 18 by means of the leverage drive means 20 so that after second bracket member 18 has been hung on to first bracket member 17, the leverage mechanism or means 20 may be actuated to slide slide block 36 upwardly to thereby engage female sockets 32 and 33 with male plugs 25 and 26 of first bracket member 17, with annular protrusion 35 seating into recess 23 of first bracket member 17.

Figure 6:
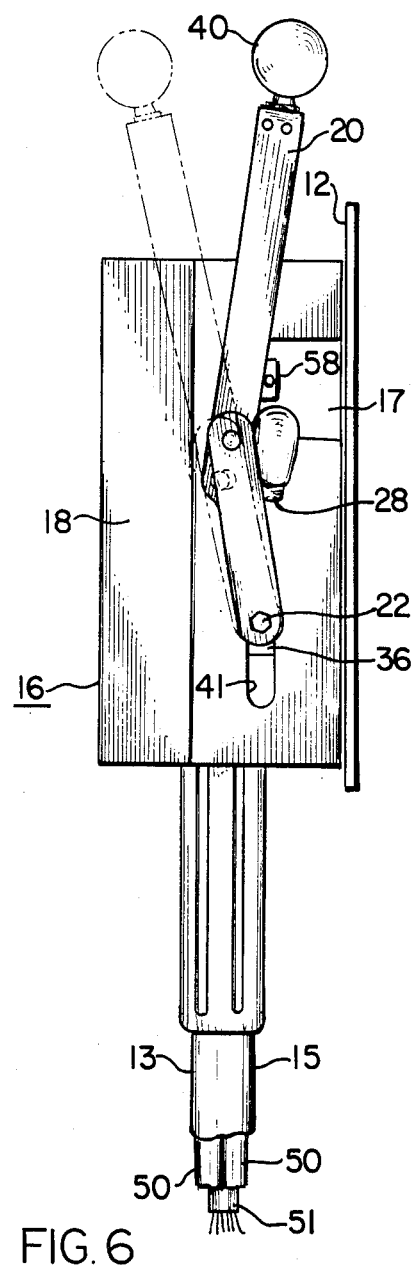
FIG. 6 is a view in side elevation of the coupling mechanism arrangement shown in FIG. 5 with chain outline indicating the operation of the locking mechanism for securing the two mounting brackets together.

In FIGS. 1, and 5 through 9, the drive means or leverage mechanism 20 is shown in its full up and lock position such that slide block 36 is urged fully upward into engagement with the underside of first mounting bracket 17 such that the electrical and air plugs and sockets are fully engaged. When the handle 40 of the lever drive mechanism 20 is grasped and pulled outwardly and down to its full disengaged position as shown in the chain outline at 20' in FIG. 9, slide block 36 is disengaged from first mounting bracket 17 and rests at its lowermost position wherein the upper surface 34 of slide block 36 is indicated in its lower most position at 34'. The vertical sliding travel of slide block 36 is guided by vertical slots 41 in the sides of second mounting bracket 18. Pivot pins 42 are secured to the sides of slide lock 36 and extend through slots 41. The leverage mechanism 20 is in turn pivitally connected to these pivot pins 42. Drive means or linkage assembly 20 is nothing more than a simple past-dead-center lever locking mechanism. When the leverage mechanism 20 is in its full release position as indicated at 20' in FIG. 9, second bracket member 18 is hung on to first bracket member 17, thus prealigning the electrical and air line plugs and sockets, and then the leverage mechanism 20 is moved from position 20' outwardly and up. When the leverage mechanism reaches the position indicated in chain outline in FIG. 6, the side block 36 is raised to its maximum upward position against the bottom side of first mounting bracket 17. This chain outline of the lever mechanism shown in FIG. 6 is described as being dead center. When handle 40 is pushed up and into the full in position indicated in FIG. 6, the lever mechanism has been pushed past dead center and thereby automatically locks bracket members 17 and 18 together with their respective plugs and sockets in engagement.

When no trailer 12 is in tow behind tractor 11, the second mounting bracket 18 may be mounted and locked in position in the same manner on to false or dummy block 17' (FIGS. 1 and 4) on the back of tractor cab 11 in the same manner as it was previously described as being secured to and detached from first mounting bracket 17. This provides convenient and easy storage and also keeps female electrical sockets 32 and female air line sockets 33 clean.

As previously described, flexible group line 13 is made up of two flexible air lines 50, which are respectively connected to female air line sockets 33, and a group electrical line 51 which has six electrical conductors therein respectively connected to the female electrical sockets within electrical socket 32, via electrical overload fuses 53 (see FIGS. 7, 8 and 10).

It is well known that when electrical power is supplied to a plug and the plug is engaged with a socket that is in turn fed to an electrical load, that arcing may occur which, over a period of time, can damage the plug and socket by causing oxidation, burring and other damage to the electrical contacts due to the arcing. In order to prevent this from occurring with the coupling mechanism of the present invention, a limit switch or contact switch 58 is provided on the side of first mounting bracket 17. When the leverage locking mechanism 20 of second mounting bracket 18 has been fully engaged past dead center to the lock position as illustrated in FIG. 6, the leverage mechanism 20 contacts switch contact 58 and thereby energizes or connects all electrical connections between electrical plug and socket 24 and 32 after engagement of this plug and socket have already been made. This accordingly eliminates damage to the electrical contacts which would be otherwise caused by arcing upon initial engagement of the plug and socket by not permitting electricity to flow through the contacts until after full engagement of the plug and socket have been accomplished.

Referring next to the embodiment of FIGS. 11, 12 and 13, similar parts are numbered with the same referenced numerals. These figures illustrate a simplified version of the coupling mechanism of the present invention wherein the selfaligning features of the structure of the previous figures is not present. In this embodiment, the group line 13 is identical to that of the previously described embodiment, however, a simplified electrical and air line hybrid socket and plug arrangement is provided. In this arrangement, a plug bracket member 18' is provided with the female electrical and air line sockets 32 and 33, as seen in FIG. 13, and the first socket bracket member 17' is internally provided with the mating male electrical plug 24 and male air line connectors 26. Plug 18' is aligned with female socket 17' by way of guide key 60 of second plug bracket number 18, which is slideably receivable into key way 61 of first socket bracket 17'. Thus all of the air line connections and electrical connections are made through one single group line 13 via a single hybrid plug and socket arrangement thereby eliminating the multiple line connections of the prior art.

Figure 14:
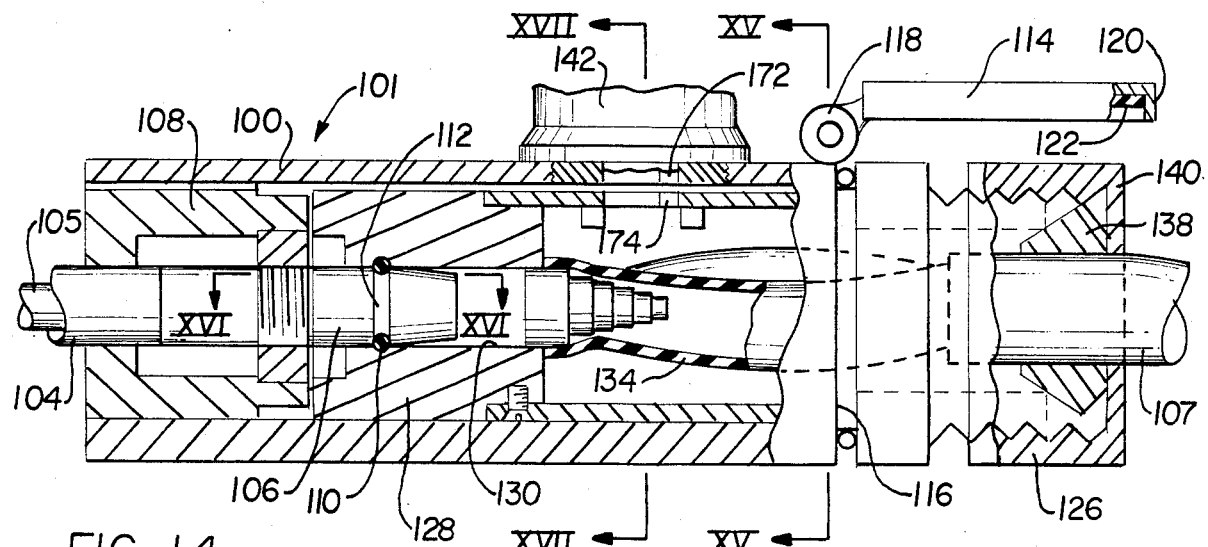
FIG. 14 is a partially sectioned side elevation of a coupling mechanism according to another presently preferred embodiment of the invention.
Figure 21:
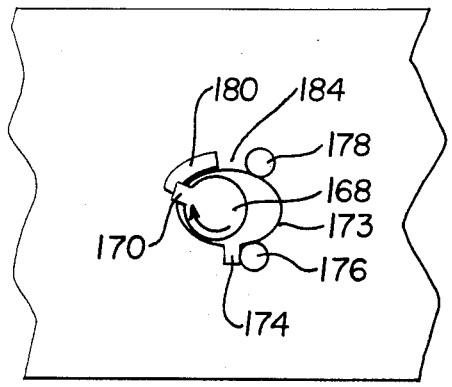
FIGS. 21 and 22 are views similar to FIG. 20 showing the progressive movement of the locking mechanism to the locked configuration.

In another presently preferred embodiment of the invention as shown in FIGS. 14 and 21, a plurality of motive energy supply lines such as a pair of air lines 104 and an electrical cable 105 are connected via a novel connection assembly 101 with a novel supply line 107 which embodies multiple motive energy supply channels in a single elongated group line segment.

Figure 15:
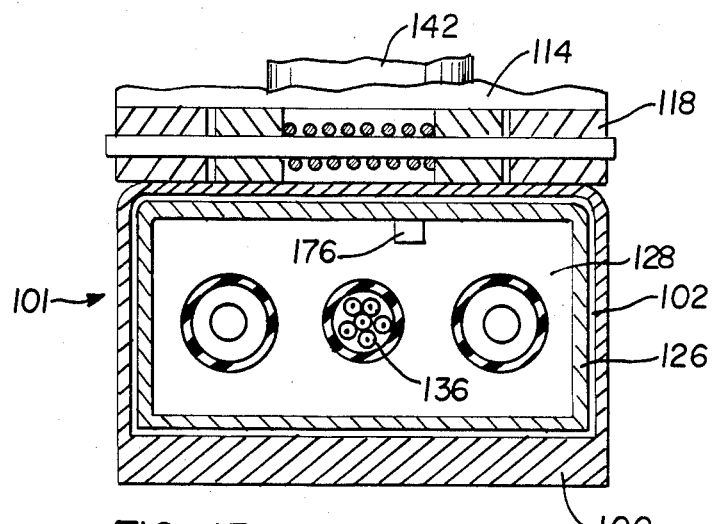
FIG. 15 is a transverse section taken on line XV—XV of FIG. 14.
Figure 16:
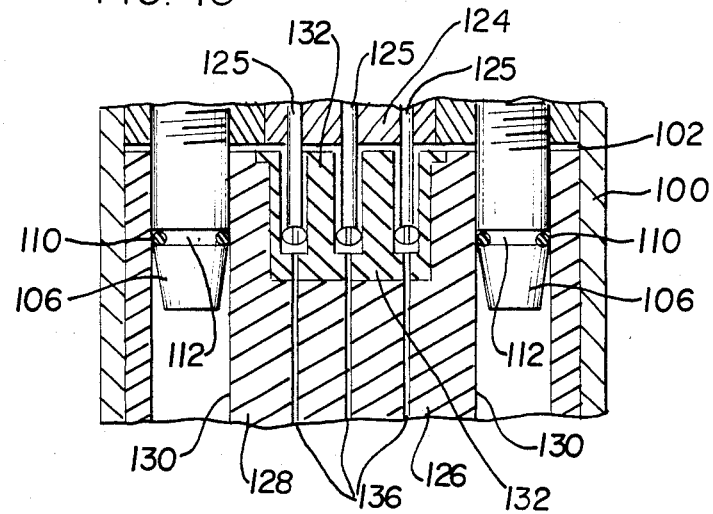
FIG. 16 is a fragmentary section taken on line XVI—XVI of FIG. 14.

Referring in particular to FIGS. 14, 15 and 16, the novel connector assembly 101 includes a socket 100 which has defined therein a generally rectangular cross-section, longitudinally extending open ended interior space 102. Connector socket 100 is mounted on a vehicle (not shown) as above described, and conventional energy sources supply motive power such as electrical power or pressurized air thereto via conventional supply lines 104 or electrical cables 105. Within connector 100, each supply line 104, 105 is connected to one component of a male female coupling. For example, for pressurized air supply the coupling may be an elongated nipple 106 which projects within space 102 from a mounting block 108 housed within connector socket 100. Any suitable resilient seal such as an O-ring 110 residing in an annular groove 112 around nipple 106 is provided for a leak tight connection of the nipple 106 with a cooperating female coupling element as below described. Other suitable seals may include a resilient packing, a compression seal element, or a resilient face sealing washer encompassing the base of nipple 106. For electrical power supply, the coupling may be a conventional pin type connector assembly 124 (FIG. 16) with the pins 125 projecting into space 102 in the same direction as nipples 106. Of course, the pins 125 may instead be the sockets of a pin and socket type electrical connector. That is, the male and female components of the electrical connection need not necessarily be in the same orientation as the air connection, but may be reversed in their orientation.

A cover member 114 is hinged to socket 100 adjacent the open end 116 thereof by a spring biased hinge 118 whereby the cover 114 is continuously biased toward the closed position. Cover 114 includes a peripheral flange portion 120 which encompasses and confines a resilient face seal 122. When cover 114 is closed, seal 122 engages the open end 116 of socket 100 to seal space 102 from the exterior environment.

Socket 100 slideably receives within space 102 a cooperating plug member 126 via open end 116 thereof. Plug member 126 includes a forward end connection block element 128 having therein forwardly open, longitudinally extending through bores 130 which cooperably receive nipples 106 to provide leak tight pressurized air connections as above described. In similar fashion, the cooperating socket counterpart 132 of pin connector 124 is carried thereby to make the electrical connections through connector assembly 101.

The bores 130 and electrical connection socket 132 are connected as via conventional air lines 134 and electrical conductors 136, respectively, with the unitary motive power supply group line 107 which is suitably secured within the rearward end of plug member 126 as by a compression clamp fitting 138.

Figure 17:
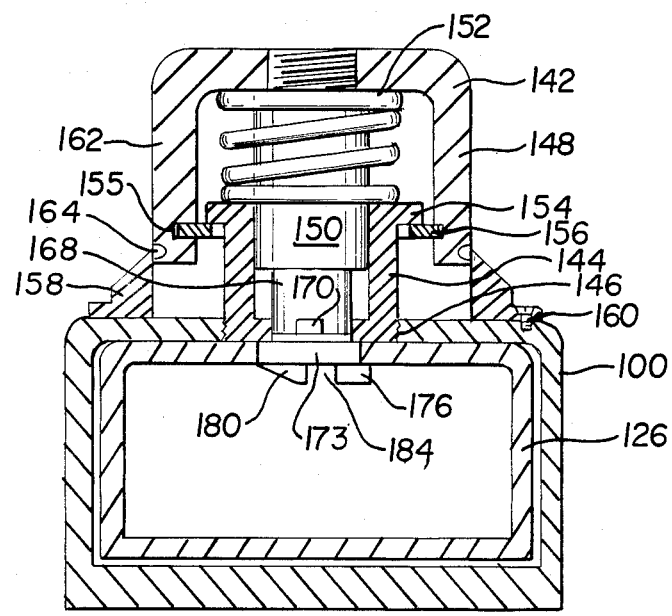
FIG. 17 is a simplified transverse section taken on line XVII—XVII of FIG. 14 and showing the mechanism in an unlocked configuration.

It is noted that with plug 126 fully inserted fully within socket 100, the flange 120 of cap 114 is maintained in biased engagement with the outermost end 140 of plug 126 and in overlapping relationship therewith to preclude inadvertent disconnection of the plug 126 from socket 100. Another more preferred locking mechanism comprises a rotary locking device 142 (FIGS. 17 through 22) which is affixed atop socket 100. Lock 142 comprises a cylindrical bushing 144 that is secured as by threaded engagement within an aperture 46 on top of socket 100. An actuator knob 148 slideably encompasses bushing 142 and an elongated locking pin member 150 is rigidly affixed coaxially with respect to knob 148 and extends downwardly therefrom into bushing 144. A compression spring 152 coaxially surrounds locking member 150 intermediate the upper end flange 154 of bushing 144 and knob 148. The spring 152 thus continuously biases knob 148 toward an upper most extreme position as shown in FIG. 17 whereat a snap ring 156 which is received within an annular groove 155 formed on the interior of knob 148 engages the underside of bushing flange 154. The annular groove 155 is formed in a depending annular skirt portion 162 of knob 148 which overlaps an annular upstanding member 158 that is affixed atop socket 100 as by screws 160 in coaxial relationship with the knob 148. Thus the interface between knob 148 and member 158 is defined by the axial overlap therebetween and an O-ring seal 164 encompasses skirt portion 162 within the zone of overlap with member 158 to seal the operating mechanism lock 142 from the exterior environment.

Figure 19:
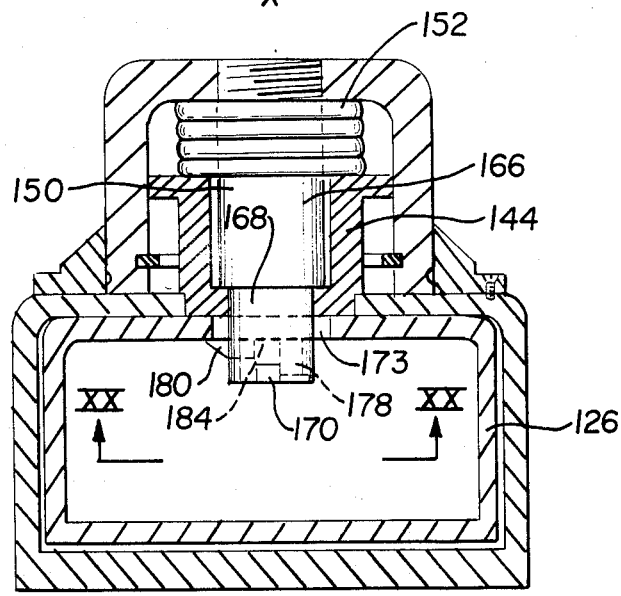
FIG. 19 is a transverse section similar to FIG. 17 showing the mechanism after initial motion of the locking pin in the locking sequence.

As will be seen, the knob 148 is movable from its normal extreme uppermost position as shown in FIG. 17, to an extreme depressed position as shown in FIG. 19 by overcoming the bias of spring 152. In the uppermost position, the locking pin member 150 is clear of plug 126 to permit selective insertion and withdrawal of the plug 126 into and out of socket 100. This permits selective making and breaking of the air and electrical connection between the adjacent vehicles.

Figure 18:
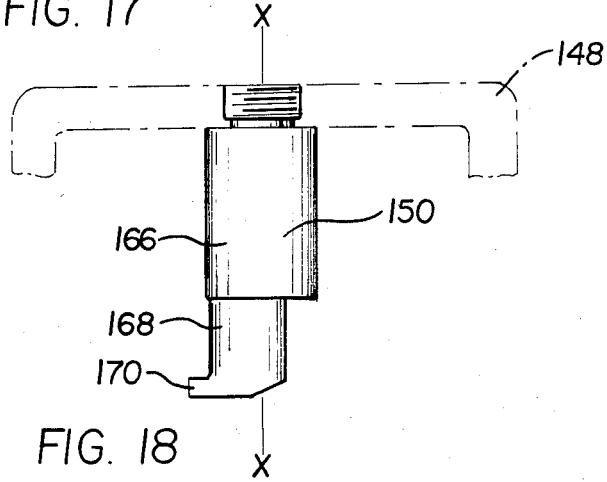
FIG. 18 is a side elevation of the locking pin of the mechanism of FIG. 17.

As shown in FIG. 18, locking member 150 comprises an elongated cylindrical body 166 which extends generally coaxially downward from knob 148, and an elongated cylindrical end portion 168 which is eccentrically located within respect to axis X—X of the body 166. A laterally projecting key tab 170 is located adjacent the free end of end portion 168. From FIGS. 14, 17, 19 and 20, it will be seen that when knob 148 is in its unlocked or uppermost position, key tab 170 resides within a cooperating key slot 172 (FIG. 14) in bushing 144 whereby the lock member 150 is non-rotatably fixed. When knob 148 is depressed under manual pressure to its lowermost position (FIG. 19), the forward or free end portion 168 thereof projects downwardly of bushing 144 and through the top of plug 126. Thus, when plug 126 is in place, the locking member 150 may be moved downwardly to a position for cooperative engagement with locking elements within plug 126 as follows.

An aperature 173 is provided in the top of plug 126 to generally coaxially register with bushing 144 when plug 126 is inserted into socket 100 to prealign the respective air and electrical connections. A key slot 174 is formed in aperature 173 to register with key slot 172 directly above and thereby allow downward passage of key tab 170 therethrough. Surrounding aperature 173 within plug 126 are cooperating locking elements including a pair of stops 176 and 178 which limit rotary movement of key tab 170 and thus limit rotary motion of knob 148. The range of rotary motion between stops 176 and 178 comprises an angle of approximately 180°, and in traversing this range of motion the key tab 170 must override an inclined camming surface 180.

It will be noted that the eccentricity of free end portion 168 causes it to follow an orbital path about axis X—X in traversing the angle from stop 176 to stop 178. Accordingly, the aperature 173 is suitably formed to accommodate such orbital movement in a way to cause plug 126 to be pulled into a fully engaged position within socket 100 upon rotation of the knob 148 to the fully locked position. The structure to accommodate such movement may be a lateral clearance 182 incorporated in the cross-sectional configuration of aperature 173 as shown, or sufficient lateral free play of plug 126 within socket 100 to accomplish the same purpose. Another possible arrangement (not shown) might include having aperature 173 formed in a plate member that is laterally slideable and longitudinally fixed with respect to plug 126.

Thus, the rotation of knob 148 produces a positive incremental engagement motion that pulls plug 126 into full operative engagement with socket 100 after partial assembly and prealignment of the plug and socket as above described.

Figure 20:
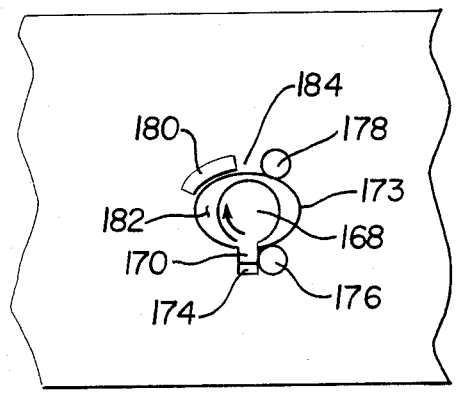
FIG. 20 is an underside plan view taken on line XX—XX of FIG. 19.
Figure 22:
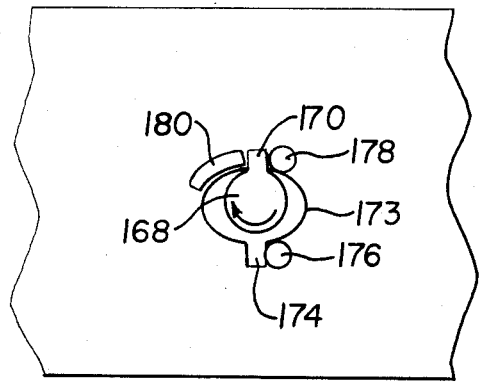

As will be seen from FIGS. 20 through 22, the locking action of lock 142 results upon depression of knob 148 against the bias of spring 152 to thereby project lock member end portion 168 into plug 126 (FIGS. 19 and 20). Then, upon initial rotation of knob 148 the key tab 170 locks against the underside periphery of aperature 173 to preclude return of the lock member 150 to its upper or disengaged position. Upon further rotation of knob 148 (FIG. 21) key tab 170 is guided up the inclined camming surface of cam 180. Ultimately the key tab 170 drops into a notch 184 which is formed intermediate the terminus of cam 180 and stop 178 (FIG. 22). The bias of spring 152 retains key tab 170 within notch 184 to thereby positively lock plug 126 against withdrawal from socket 100.

To release plug 126, knob 148 must be depressed against the bias of spring 152 to allow key tab 170 to override the end of cam 180 so that it can be moved out of notch 184 by knob rotation to move the key tab back over cam surface 180 and to its release or disengagement position adjacent to stop 176 as in FIG. 20. Of course, in so doing the plug 126 is moved incrementally in the disengagement direction. Upon reaching the release position, the spring 152 is effective to bias lock member 150 upwardly to the FIG. 17 position whereby the end portion 168 again clears plug 126. Because the freed plug 126 and socket 100 are subjected to the separating bias of air pressure in lines 104, the air and electrical connections are separated by air pressure to alleviate all undue effort, including pulling, wiggling, rocking, and the like, which typically are required to separate such connections. This advantageous feature permits straight in and out motion for connecting and disconnecting, and eliminates the need for much of the superfluous motion which in the prior art has resulted in damage to the conenctor components and resultant premature failure.

Figure 23:
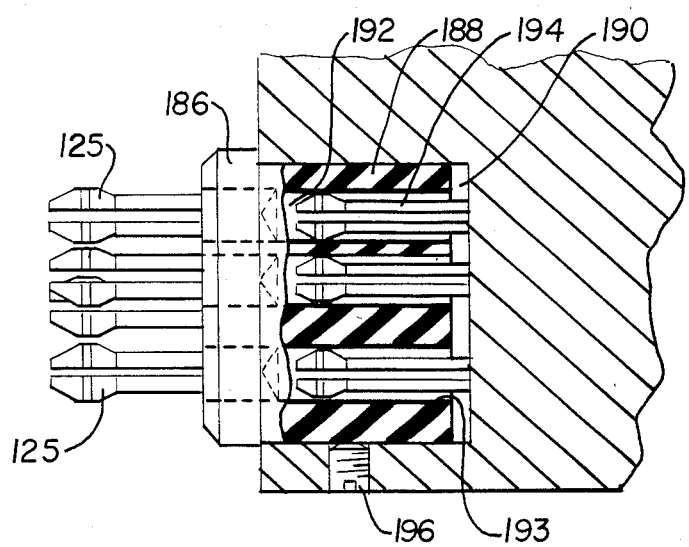
FIG. 23 is a sectional side elevation of a novel electrical connection according to the invention.
Figure 24:
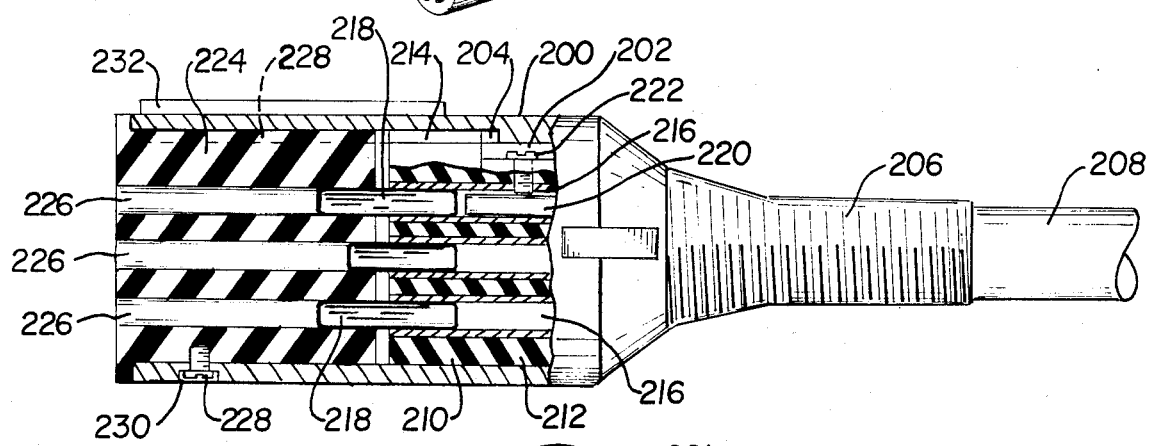
FIG. 24 is a sectional elevation of an alternative electrical connection.

FIGS. 23 and 24 illustrate a further novel aspect of the invention in an electrical connector for use in conjunction with a pin and socket electrical connector assembly such as connector pin unit 124. According to FIG. 23, the connector pins 125 of a pin and socket electrical connector are carried by a connector pin module 186 having a body member 188 which is received into a recess 190 formed in the connector member with which the pin connectors are associated. The body 188 includes a respective socket 192 with a conducting sleeve 193 corresponding to each pin 125. The socket 192 receives respective cooperating conductor pins 194 that project within recess 190. A set screw 196 secures body member 188 within recess 190. When the connector pins 125 sustain sufficient wear and/or damage through repeated connection and disconnection over a period of use, and through pin surface degradation such as pitting and qalling produced by electrical arcing, they may be replaced by merely backing out set screw 196 and replacing pin module 186 with a new module 186. This permits connector pin renewal without sacrifice of the entire connector assembly and without time consuming and difficult re-wiring of the connector. As pins 194 are isolated from the exterior environment and are continuously in electrical engagement within socket 192, their service life is greatly extended over that of conventional connectors and therefore the cost impact of frequent replacement of the entire connector assembly is eliminated. To further extend connector pin life, the pin and socket pair forming the ground connection may be configured to engage only after the hot connections engage, thus isolating all electrical arcing in the ground connection. To accomplish this, either or both the ground pin 194 and the respective sleeve 193 may be shorter than the rest of the respective pins 194 and/or sleeves 193.

Of course, the module 186 may be modified for use with either the make or the female side of a pin type electrical connector. In addition, the module 186 may be utilized with equal benefit in a hybrid group line connector such as hereinabove described, or in a conventional electrical tractor-trailer electrical connector assembly. For example, as shown in FIG. 24 the female side of a pin type electrical connector comprises a generally cylindrical rigid body 200 of cast metal having an axially extending interior opening 202 that defines a keyway 104. Suitable strain relief means such as spring wire windings 206 provide a lead in for one end of a multi-conductor electrical cable 208.

A pin connector member 210 is received axially within opening 202. Member 210 includes a insulating body 212 having a key 214 that is received into keyway 204 to non-redundently align the member 210 within opening 202. Member 210 carries a plurality of conductive, cylindrical sleeves 216 which receive respective conductive pins 218 within the forward ends thereof and the conductors 220 of cable 208 within the rearward ends thereof. For each sleeve 215, an associated transversely projecting clamp screw 222 provides for clamping of conductor 220 in secure, electrically conductive engagement with sleeve 216.

A replaceable socket connector module 224, shown as an insulating socket module, is received within opening 202 and includes a plurality of conductive sleeves 226 that are positioned to register with pins 218. A key 228, similar in all salient respects to key 214, is provided on the exterior of module 224 for proper alignment of module 224 within opening 202 by registry of key 228 with keyway 204. In this aligned configuration, sleeves 226 are in proper alignment with pins 218. Accordingly, module 224 may be inserted into electrically conductive engagement with member 210 within body 200, and secured therein by a screw 229 which, when installed, is recessed within a shallow counter bore 230 formed on the exterior of body 200. Alternatively, module 224 may be retained within body 200 by a spring biased tab carried by module 224 and engageable within a radial aperture formed in body 200. Preferably, such a tab would be accessible from the exterior of body 200 (e.g. through the aperture within which it is engaged) as by use of a screwdriver or similar tool, for convenient release of the module 224 from body 200.

The forward open ends of sleeves 226 serve as sockets to receive the pins of the male half of the electrical connector, (not shown) which may be a conventional recessed pin connector mounted on a highway tractor or trailer. As is known, in such a conventional connector, the female connector is externally configured similarly to body 200 of FIG. 24 and includes a key 232 which is received within a cooperating keyway of the reversed pin housing. To avoid confusion, it is noted that the member of FIG. 24 may often be called the "plug" and the cooperating member into which it fits the "socket", even though the pins typically are recessed in the "socket" member and upon connection are received into individual sockets in the "plug" member as shown.

As an alternative or additional structural means to ensure non-redundent connection of module 224 with pins 218, the pins 218 may be of differing sizes or cross-sectional configuration or may be arranged in an asymmetrical pattern. Preferably, for purposes of simplicity, the structural arrangement of pins 218 corresponds to that of the pins recessed in the conventional socket member (not shown) so that the sleeves 226 may be uniformly configured from end to end.

Figure 25:
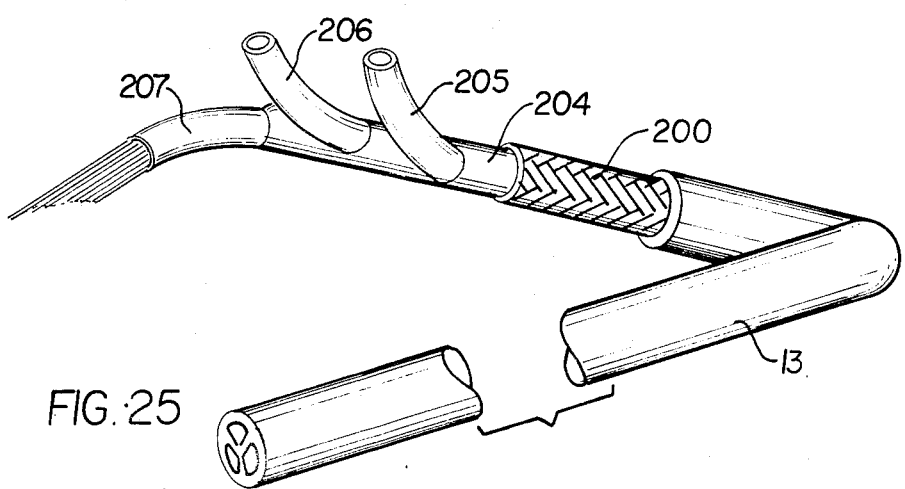
FIG. 25 is a fragmentary perspective view of another preferred embodiment for a group line of FIG. 1.
Figure 26:
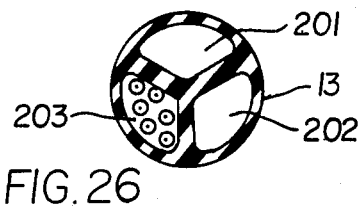
FIG. 26 is a transverse sectional view of the group line of FIG. 24.

FIGS. 25 and 26 illustrate more clearly a portion of the flexible group line 13 as has been disclosed hereinabove with reference to FIG. 1. The group line 13 preferably includes an elongated molded or extruded flexible member of suitably resilient and flexible elastomeric material which may include embedded reinforcement of braided wire 200 as shown in FIG. 25 only. Within the group line 14 are a plurality of longitudinally extending channels such as three channels 201, 202 and 203. Two of these channels are utilzied as pressurized air flow passages while the third channel carries electrical conductors. Thus, both air and electrical power are conveyed in the single group line between the connected vehicles. Adjacent each end of group line 13 there is provided suitable adaptor 204 for branching the channels 201, 202 and 203 into separate conventional air and electrical lines. Of course, as has been disclosed, the group line 13 may be formed with a permanent resilient coil form to improve line management and eliminate line tangling, kinking and the like.

The above and other embodiments of the invention having been envisioned and anticipated by the inventors, it is intended that the invention be construed as broadly as permitted by the scope of the claims appended hereto.

I claim:

1. A coupling mechanism for coupling elongated flexible energy conveying lines such as fluid and electrical lines between adjacent coupled vehicles comprising, a plurality of such elongated flexible lines grouped together to form a unitary elongated flexible group line, one end of said group line connected to respective energy sources on one vehicle and the other end of said group line connected to respective energy loads on another vehicle through a single hybrid or combination plug and socket apparatus;

said plug and socket apparatus including a first mounting bracket secured to said other vehicle and a second mounting bracket secured to said other end of said group line and adapted for mating and prealigned hanging engagement with respect to said first mounting bracket, and plug and socket members secured, respectively, to said first and second mounting brackets to be thereby prealigned for operative engagement of said plug and socket members when said mounting brackets are in said hanging engagement, and moveable drive means cooperable with said plug and socket apparatus to drive said plug and socket members axially into operative engagement after such prealignment thereof.

2. The coupling mechanism of claim 1 wherein at least one of said lines is an electrical line and said plug and socket apparatus includes switch means operable to automatically close an electrical circuit path for said electrical line after said plug and socket members have been operatively engaged by said drive means.

3. The coupling mechanism of claim 1 wherein one of said mounting brackets includes a vertically extending horn secured to upper portions thereof and the other of said mounting brackets includes an opening in upper portions thereof for receiving and seating said horn to interlockingly engage said second bracket on said first bracket.

4. The coupling mechanism of claim 3, wherein said brackets have engaging body portions which underlie said horn and opening and which body portions further respectively have mating convex and concave contoured sealing surfaces adapted to gravitationally selfalign said second bracket accurately with said first bracket after said horn has been engaged in said opening to accurately prealign said plug and socket members.

5. The coupling mechanism of claim 1 wherein said flexible group line is permanently spring coiled with elastic memory.

6. The coupling mechanism of claim 1 including a third mounting bracket secured to said one vehicle and contoured to mate said first mounting bracket to provide a false or storage mount for said second mounting bracket when said vehicles are not coupled together.

7. The coupling mechanism of claims 1, 3 or 4, said movable drive means comprising, a slide block mounted for limited axial sliding on said second mounting bracket, one of said plug and socket members being mounted on said slide block and the other mounted on said first mounting bracket, rotary means mounted on said second bracket and connected to said slide block to axially slide said slide block when said rotary means is actuated to axially engage said plug and socket members together, said rotary means being adapted to lock in position when fully actuated to engage said plug and socket members.

8. The coupling mechanism of claim 7, wherein at least one of said lines is an electrical line and including switch means on said plug and socket apparatus to be activated by said rotary means when moved to said fully actuated position to electrically engage said electrical lines.

9. The coupling mechanism of claim 8, wherein said rotary means is a pivotal lever means.

10. The coupling mechanism of claim 9, wherein said pivotal lever means includes an over center toggle means for locking said lever means in its fully actuated position.

11. A coupling apparatus for coupling a plurality of motive power conveying means between a pair of adjacent mobile vehicles to permit transmission therebetween of multiple modes of motive power including at least pressurized air and electrical power such that motive power in one such vehicle is provided to supply motive power to respective energy loads in the other such vehicle, said coupling apparatus comprising;

a hybrid combination plug and socket assembly;

said assembly including a socket member adapted to be operatively connected to one of such vehicles and a plug member which is operatively engageable within said socket member, and is adapted to be operatively connected to the other of such vehicles;

said socket and plug members including cooperating air and electrical connection means which are operatively engageable for delivery of pressurized air and electrical power, respectively, through said assembly when said plug member is operatively engaged within said socket member; and said plug and socket assembly including prealignment means which permits said plug member to be positioned in a self-supporting axially prealigned position with respect to said socket member, and a movable drive means which is operable to drive said prealigned plug and socket members axially together into locked operative engagement for conveyance therethrough of such multiple modes of motive power between such vehicles.

12. The coupling apparatus as claimed in claim 11 additionally including motive power conveying means comprised of an elongated flexible unitary group line means for conveying such multiple modes of motive power.

13. The coupling apparatus as claimed in claim 12 wherein said group line means includes a unitary, elongated body member having a plurality of integrally formed, longitudinally extending motive power conveying channels defined therein within the confines of an integrally formed, continuously extending peripheral exterior wall.

14. The coupling apparatus as claimed in claim 11 wherein said electrical connection means includes a multiple pin plug and cooperable socket which are axially interengageable for transmission of electrical power between said plug and socket members.

15. The coupling apparatus as claimed in claim 14 wherein said air connection means includes cooperating elongated nipple and socket connectors which are axially interengageable to provide sealed conveyance of pressurized air between said plug and socket members.

16. The coupling apparatus as claimed in claim 14 wherein said electrical connection means includes selectively replaceable adaptor means carrying a connection portion of said multiple pin plug and cooperable socket, said connection portion being selectively releasable from said electrical connection means for selective replacement thereof.

17. In an assembly for connecting plural modes of motive power including at least pressurized air and electrical power from motive power sources to respective energy loads, an elongated motive power conveying means comprising:

an elongated body member;

a plurality of motive power conveying channels formed integrally within said body member and extending continuously throughout the longitudinal extent thereof;

said body member including an integrally formed, continuously extending exterior peripheral wall which forms at least an outer wall portion of each of said channels;

means connecting each end of said body member to other motive power conveying means in a manner that each said channel is operatively connected with only a selected one of such other motive power conveying means; and said plurality of channels including at least one channel which conveys pressurized air therein and at least one channel which guides electrical conductor means therein.

18. The motive power conveying means a claimed in claim 17 wherein said external peripheral wall additionally includes reinforcement means extending continuously therewith.

19. The motive power conveying means as claimed in claim 18 wherein said reinforcement means includes a braided metal jacket encompassing said channels.

20. The motive power conveying means as claimed in claim 19 wherein said reinforcement means is embedded in said outer peripheral wall.

21. In an electrical connector which is cooperable with a mating connector for connecting electrical loads in a first mobile vehicle with an electrical power source in a second mobile vehicle which is adapted to tow such first mobile vehicle, a connector assembly comprising:

an elongated connector body having an axial through opening extending therewithin;

said through opening being adapted to receive electrical conductor means into one end of said connector body;

a connector member cooperable with said opening means to be non-redundently received into the other end of said body;

said connector member including plural securing means for receiving and securing a respective plurality of such electrical conductor means in electrically conductive engagement within said body and electrically insulated from said body;

said connector member additionally including electrically conductive means which are electrically connected to said plural securing means and are accessible from said other end of said body;

a replaceable connection module cooperable with said opening means to be received into said other end of said body and into electrically conductive engagement with said conductive means;

said replaceable connection module including connection means extending therewithin to provide an electrical connection between each of said conductive means and such a mating connector adjacent said other end of said body; and selectively releasable securing means for securing said replaceable connection module within said body adjacent said other end thereof with said connection means in electrical engagement with said conductive means whereby said replaceable module is readily replaceable to renew said connection means.

22. The connector assembly as claimed in claim 21 wherein said connection means includes socket means extending within said replaceable module to receive said conductive means into one end of said module spaced from said other end of said body and to receive the pins of such a mating connector into the other end of said module located adjacent said other end of said body.

23. The connector assembly as claimed in claim 21 wherein said selectively releasable securing means includes a radially biased tab means on said module which is engageable within a radially inner extent of an aperture formed in a peripheral portion of said body.

* * * * *